United States Patent [19]
Wei

[11] Patent Number: 5,931,894
[45] Date of Patent: Aug. 3, 1999

[54] POWER-SUM CIRCUIT FOR FINITE FIELD $GF(2^M)$

[75] Inventor: Shyue-Win Wei, Hsin-Chiu, Taiwan

[73] Assignee: National Science Council, Taipei, Taiwan

[21] Appl. No.: 08/966,148

[22] Filed: Nov. 7, 1997

[51] Int. Cl.⁶ ................................................... G06F 7/00
[52] U.S. Cl. ................................................... 708/492
[58] Field of Search ........................... 364/746.1, 768, 364/736.02, 754.01

[56] References Cited

U.S. PATENT DOCUMENTS

| | | | |
|---|---|---|---|
| 4,745,568 | 5/1988 | Onyszchuk et al. | 364/746.1 |
| 5,046,037 | 9/1991 | Cognault et al. | 364/746.1 |
| 5,101,431 | 3/1992 | Even | 364/746.1 |

Primary Examiner—Tan V. Mai
Attorney, Agent, or Firm—Tung & Associates

[57] ABSTRACT

A cellular-array power-sum circuit designed to perform $AB^2+C$ computations in the finite field $GF(2^m)$ is presented, where A, B, and C are arbitrary elements of $GF(2^m)$. This new circuit is made up of $m^2$ identical cells each consisting of an AND logic unit and an exclusive-OR logic unit. The AND logic unit may be configured to comprise three 2-input AND gates, and the exclusive-OR logic unit may be configured to comprise one 4-input XOR gate. The presented cellular-array power-sum circuit has a computation time of $2m$ gate delays. It is this power-sum circuit that provides basis for using circuits of pipeline architectures to compute exponentiations, inversions, and divisions in $GF(2^m)$.

12 Claims, 9 Drawing Sheets

NOTE:

1. $p_{m-2}^{(k-1)}$ is output signal of the $(k,i)$cell

2. $p_{m-i-1}^{(k)}$ is output signal of the $(k,i+1)$cell

3. $p_{m-i-2}^{(k-1)}$ is output signal of the $(k,-1,i+2)$cell

4. $p_{m-2}^{(k-1)}$ is output signal of the $(k-1,2)$cell

5. $p_{m-1}^{(k-1)}$ is output signal of the $(k-1,1)$cell a SW circuit (a) detailed circuit of a 4-cell L-SHIFTER (b) detailed circuit of a 4-cell R-SHIFTER (c) R( or L ) FSC Circuit

POWER-SUM CIRCUIT FOR FINITE FIELD GF($2^M$)

FIELD OF THE INVENTION

The present invention generally relates to a circuit for performing $AB^2$ computations in a finite field GF($2^m$), where A, B, and C are arbitrary elements of GF($2^m$), particularly to a circuit for performing $AB^2+C$ computations in the finite field, and specifically to a cellular-array power-sum circuit performing $AB^2+C$ computations in the finite field.

BACKGROUND OF THE INVENTION

Index Terms: Coding theory, finite field, power-sum, cellular- array circuit, VLSI architecture.

References:

[1] T. R. N. Rao, and E. Fujiwara, Error-Control Coding for Computer Systems. Prentice-Hall, Englewood Cliffs, N.J., 1989.

[2] R. E. Blahut, Theory and Practice of Error Control Codes. Addison-Wesley, Reading, Mass., 1983.

[3] W. W. Peterson, and E. J. Weldon, Jr., *Error-Correcting Codes*. 2nd ed., The MIT Press, Cambridge, Mass., 1972.

[4] S. Lin, and D. J. Costellor, Jr., *Error Control Coding*. Prentice Hall, Englewood Cliffs, N.J., 1983.

[5] S. W. Wei, and C. H. Wei, "High speed decoder of Reed-Solomon codes," *IEEE Trans. Commun.*, vol.COM-41, no.11, pp. 1588–1593, November 1993.

[6] S. R. Whitaker, J. A. Canaris, and K. B. Cameron, "Reed Solomon VLSI codec for advanced television," *IEEE Trans. Circuits and Systems for Video Technology*, vol.1, No.2, pp.230–236, June 1991.

[7] S. W. Wei, and C. H. Wei, "A high-speed real-time binary BCH decoder," *IEEE Trans. Circuits and Systems for Video Technology*, vol.3, no.2, pp. 138–147, April 1993.

[8] E. R. Berlekamp, "Bit-serial Reed-Solomon encoders," *IEEE Trans. Inform Theory*, vol. IT-28, pp. 869–874, 1982.

[9] C. C. Wang, T. K. Truong, H. M. Shao, L. J. Dentsch, J. K. Omura, and I. S. Reed, "VLSI architectures for computing multiplications and inverses in GF($2^m$)," *IEEE Trans. Comput.*, vol. C-34, pp. 709–716, 1985.

[10] C. -S. Yeh, Irving S. Reed, and T. K. Truong, "Systolic multipliers for finite fields GF($2^m$)," *IEEE Trans. Comput.*, vol. C-33, pp.357–360, 1984.

[11] B. A. Laws, Jr., and C. K. Rushforth, "A cellular-array multiplier for GF($2^m$)," *IEEE Trans. Comput.*, vol. C-20, pp. 1573–1578 1971.

[12] H. Okano, and H. Imai, "A construction method of high-speed decoders using ROM's for Bose-Chaudhuri-Hocquenghem and Reed-Solomon codes," *IEEE Trans. Comput.*, vol. C-36, pp. 1165–1171, 1987.

[13] K. Araki, I. Fujita, and M. Morisue, "Fast inverter over finite field based on Euclid's algorithm," *Trans. IEICE*, vol. E-72, pp.1230–1234, November 1989.

[14] P. A. Scott, S. J. Simmons, S. E. Tavares, and L. E. Peppard, "Architectures for exponentiation in GF($2^m$)," *IEEE J Selected Areas in Commmun.*, vol.6, No.3, pp.578–586, April 1988.

[15] C. C. Wang, and D. Pei, "A VLSI design for computing exponentiations in GF($2^m$) and its application to generate pseudorandom number sequences," *IEEE Trans. Comput.*, vol. C-39, No.2, pp. 258–262, February 1990.

[16] A. M. Odlyzko, "Discrete logarithms in finite fields and their cryptographic significance," in *Adv. Cryptol., Proc. Eurocrypt'84*, pp.224–314, Paris, France, April 1984.

Arithmetic Operations based on Finite Field GF($2^m$) have recently called significant attention because of their important and practical applications in the areas of computers and communications, such as the forward error-correction codes (recommended references [1]–[4]). To configure an error-correcting decoder with a high decoding speed and low circuit complexity, well designed basic arithmetic circuits in association with a powerful decoding algorithm are required. Therefore improvements in the design of finite field arithmetic circuits that yield lower circuit complexity, shorter computation delay, and higher computation speed is an extensive research topic in finite field arithmetic. Addition, multiplication, exponentiation, multiplicative inverse, and division are the most important arithmetic operations for error- correcting codes. For example, the most popular decoding procedure for a quat-error-correcting binary primitive BCH code consists of three main steps (recommended references [2]–[4] ): (i) calculating the syndrome values $S_i$, i=1, 3, 5, 7 from the received word; (ii) determining the error-locator polynomial $\sigma(x)=x^4+\sigma_1 x^3 30$ $\sigma^2 x^2 +\sigma_3 x+\sigma_4$ from the syndrome values, where $\sigma_1=S_1$, $\sigma_2=\{\{S_1[S_7+(S_1)^7]\}+\{S_3[S_5+(S_1)^5]\}\}/\{\{S_3[S_3+(S_1)^3\}+\{S_3[S_5+(S_1)^5\}\}$, $\sigma_3=(S_1)^3+S_3+S_1\sigma_2$, and $\sigma_4=\{[S_5+S_3(S_1)^2]+[S_3+(S_1)^3]\sigma_2\}/S_1$ [2]; (iii) solving for the roots of $\sigma(x)$, which are the error locators. Such a way to determine the coefficients of the error locator polynomial, $\sigma_2$, $\sigma_3$, and $\sigma_4$, may require additions, multiplications, exponentiations, and inversions (or divisions). One can obviously see from this example that multiplication is one of the most frequently used field arithmetic operations. However, performing some operations, e.g. exponentiation, using ordinary multiplication might be inefficient. For instance, the above example of quat-error-correcting binary primitive BCH code requires several multiplications to calculate $[S_7+(S_1)^7]$ in $\sigma_2$, but requires only two $AB^2+C$ operations to obtain the same result (that is, $S_1[S_1(S_1)^2+0]^2+S_7$). It is confirmed by these references that the $AB^2+C$ operation is an efficient tool to implement such a computation. As will be discussed in two divisional applications, the $AB^2+C$ operation can also be used to execute exponentiations, inversions, and divisions efficiently. The $AB^2+C$ operations, exponentiations, inversions, and divisions are also frequently used in decoding other binary BCH and Reed-Solomon (RS) codes (recommended references [5]–[7]).

Many architectures over GF($2^m$) have already been developed upon various bases, such as a bit-serial multiplier that uses a dual basis (recommended reference [8]), a multiplicative inverter that uses a normal basis (recommended reference [9]), and a systolic multiplier that uses a standard basis ( recommended reference [10]). The finite field operations of the first two types need basis conversion, whereas the third one does not. Each type of finite field operation possesses distinct features that make it suitable for specific applications. For decoders used in computers and digital communications, the standard basis is still the most frequently used basis. Therefore, we confine our attention to the computations over the standard basis alone.

It is difficult to design a finite field arithmetic circuit having low circuit complexity while simultaneously maintaining a high computation speed. In general, a trade-off between computation speed and circuit complexity is often necessary. Designing a standard basis circuit that performs only addition is quite simple. It can be implemented by using m exclusive-OR (XOR) gates (recommended reference [1]–[2]). The first parallel-in-parallel-out multiplier architecture was the static cellular-array product-sum multiplier, presented by Laws in 1971 (recommended reference [11]). The circuit for it consisted of $m^2$ identical cells, each consisting of two 2-input AND gates and one 3-input XOR gate. The cellular-array multiplier requires 2m logic gate delays to perform a multiplication. In order to improve the computation speed, Yeh presented a parallel-in-parallel-out systolic product-sum multiplier in 1984 (recommended reference [10]); this circuit is composed of $m^2$ identical cells, each of which consisted of two AND gates, two 2-input XOR gates and seven latches. For successive operations, the cellular-array multiplier still requires 2m gate delays to perform each multiplication, whereas the systolic multiplier needs only one cell time unit of two gate delays to perform a multiplication subject to a computation delay of 2m cell time units at the beginning. After Yeh's systolic multiplier was presented, it was believed that the cell time unit of two logic gate delays could not be further improved upon (recommended reference [10]).

In principle, division in a finite field may be performed using a multiplication and a multiplicative inverse, i.e., $A/B=AB^{-1}$, in which A and B are arbitrary elements of $GF(2^m)$. A multiplicative inverse can be implemented using read-only memory (ROM) (recommended reference [12]), Euclid's algorithm (recommended reference [13]), or a number of consecutive multiplications (recommended reference [9]). Most of the architectures for computing multiplicative inverses have been developed upon the normal basis. A major reason for the development is that the squaring operation in the normal basis is only a simple cyclic shift (recommended reference [9]). Computation of exponentiation resembles the computation of multiplicative inverse. Exponentiation can also be implemented using ROM and successive multiplications. Several architectures for computing exponentiation in $GF(2^m)$ have been developed upon the standard as well as the normal bases (recommended reference [14]–[15]).

SUMMARY OF THE INVENTION

Objects of the Invention:

The general object of the present invention is to provide a circuit of simple structure for performing $AB^2$ and $AB^2+C$ computations in a finite field $GF(2^m)$, where A, B, and C are arbitrary elements of $GF(2^m)$.

The particular object of the present invention is to provide a circuit for performing $AB^2$ and $AB^2+C$ computations based on which operations of exponentiation, multiplicative inverse, and multiplications, that are relevant to error-correction coding, can be efficiently implemented.

Introduction to Algorithm for Power-Sum Circuit of the Invention:

A finite field $GF(2^m)$ contains 2m elements $\{0, 1=\alpha^0=\alpha^\lambda, \alpha^1, \alpha^2, \ldots, \alpha^{\lambda-1}\}$, where $\lambda=2^m-1$ and the primitive element $\alpha$ is a root of the primitive polynomial $F(x)$. A polynomial $F(x)$ of degree m is called primitive if the smallest positive integer n for which $F(x)$ divides $x^n+1$ is $n=2^m 1$ (recommended reference [4]). Let $F(x)=x^m+f_{m-1}x^{m-1}+f_{m-2}x^{m-2}+\ldots+f_1x+1$ be the primitive polynomial of $GF(2^m)$; then $f_i$, $i=1, 2, \ldots, m-1$, $\hat{I}\{1, 0\}$. There are two representations of the elements in $GF(2^m)$. One is the so-called power representation $\{0, 1, \alpha^1, \alpha^2, \ldots, \alpha^{n-1}\}$. Since the primitive element $\alpha$ is a root of the primitive polynomial, it yields $F(\alpha)=0$. Since $F(\alpha)=0$ and $F(x)$ divides $x^\lambda+1$, we have $\alpha^\lambda+1=0$, or equivalently $\alpha^n=1=\alpha^0$. This condition implies that the non-zero elements of the finite field are closed over multiplication. In fact, the results of operations such as addition, multiplicative inverse, and exponentiation of elements in $GF(2^m)$ are also elements in $GF(2^m)$ (recommended reference [1]–[4]). On the other hand, since $F(\alpha)=0$, we have $\alpha^m=f_{m-1}\alpha^{m-1}+f_{m-2}\alpha^{m-2}+\ldots+f_1\alpha+1$. By means of this modulo polynomial, any element of $GF(2^m)$ can be expressed as a polynomial of $\alpha$ with degree less than m. This is called the polynomial representation. A polynomial of degree m-1 is normally represented by an m-tuple vector in hardware implementation (recommended reference[4]). The properties of finite fields are covered in detail in (recommended reference [1]–[4]).

Suppose B is an element of $GF(2^m)$; it can then be expressed in polynomial form as $B=b_{m-1}\alpha^{m-1}+b_{m-2}\alpha^{m-2}+\ldots+b_1\alpha+b_0$, where $b_i=0$ or 1, $i=0, 1, \ldots, m-1$. It was known that the power-2 operation of element B in $GF(2^m)$ can be expressed as $B^2=b_{m-1}\alpha^{2m-2}+b_{m-2}\alpha^{2m-4}+\ldots+b_1\alpha^2+b_0$ (recommended reference [3]–[4]). Let A be another element of $GF(2^m)$, expressed as $A=a_{m-1}\alpha^{m-1}+a_{m-2}\alpha^{m-2}+\ldots+a_1\alpha+a_0$. If $P=p_{m-1}\alpha^{m-1}+p_{m-2}\alpha^{m-2}+\ldots+p_1\alpha+p_0$ is the produce of A and $B^2$, then $P=AB^2$ can be written as follows:

$$P = A \cdot \sum_{k=0}^{m-1} b_k \alpha^{2k} \qquad (1)$$

$$= \sum_{k=0}^{m-1} (A \cdot \alpha^{2k}) b_k$$

$$= \{\{\{[(Ab_{m-1}\alpha^2 + Ab_{m-2})\alpha^2 + Ab_{m-3}]\alpha^2 + Ab_k\}\alpha^2 +$$

$$Ab_{m-4}\}\alpha^2 + \ldots\}\alpha^2 + Ab_0$$

$$= P(k)|_{k=m}$$

[here (1) denotes equation (1)]
[hereafter (n) denotes equation (n)]
where the term $P(k)$ is recursively defined as $$P(k)=P(k-1)\alpha^2+Ab_{m-k} \text{ for } k=2,3,\ldots,m =p_{m-1}^{(k)}\alpha^{m-1}+\ldots +p_1^{(k)}\alpha^1+p_0^{(k)}. \qquad (2)$$

Obviously, $P(k)$, $k=1, 2, \ldots, m$, is still an element of $GF(2^m)$ with the initial value $$P(1)=Ab_{m-1}=a_{m-1}b_{m-1}\alpha^{m-1}+a_{m-2}b_{m-1}\alpha^{m-2}+\ldots+a_1b_{m-1}\alpha+a_0b_{m-1}. \qquad (3)$$

Furthermore, $P(k-1)\alpha^2$ can also be expressed as $$P(k-1)\alpha^2 = p_{m-1}^{(k-1)}\alpha^{m+1} + p_{m-2}^{(k-1)}\alpha^m + \sum_{n=2}^{m-1} p_{n-2}^{(k-1)}\alpha \qquad (4)$$

Using the modulo polynomials $$\alpha^m = f_{m-1}\alpha^{m-1} + \cdots + f_2\alpha^2 + f_1\alpha^1 + f_0 \qquad (5)$$

$$= \sum_{n=0}^{m-1} f_n\alpha^n$$

$$\alpha^{m+1} = f_{m-1}\alpha^m + \cdots + f_2\alpha^3 + f_1\alpha^2 + f_0\alpha^1 \qquad (6)$$

$$= f'_{m-1}\alpha^{m-1} + \cdots + f'_2\alpha^2 + f'_1\alpha^1 + f'_0$$

$$= \sum_{n=0}^{m-1} f'_n\alpha^n$$

and substituting into (4) yields $$P(k-1)\alpha^2 = p_{m-1}^{(k-1)}\alpha^{m+1} + p_{m-2}^{(k-1)}\alpha^m + \sum_{n=2}^{m-1} p_{n-2}^{(k-1)}\alpha^n \qquad (7)$$

$$= p_{m-1}^{(k-1)} \sum_{n=0}^{m-1} f'_n \alpha^n + p_{m-2}^{(k-1)} \sum_{n=0}^{m-1} f_n \alpha^n + \sum_{n=2}^{m-1} p_{n-2}^{(k-1)} \alpha^n$$

$$= \sum_{n=2}^{m-1} \left( p_{n-2}^{(k-1)} \oplus p_{m-1}^{(k-1)} f'_n \oplus p_{m-2}^{(k-1)} f_n \right) \alpha^n +$$

$$\left( p_{m-1}^{(k-1)} f'_1 \oplus p_{m-2}^{(k-1)} f_1 \right) \alpha + \left( p_{m-1}^{(k-1)} f'_0 \oplus p_{m-2}^{(k-1)} f_0 \right)$$

in which the symbol $\oplus$ indicates addition over GF(2). This may be implemented using a 2-input XOR gate in hardware. Substituting (7) into (2), we have $$P(k) = P(k-1)\alpha^2 + Ab_{m-k} \qquad (8)$$

$$= p_{m-1}^{(k-1)} \alpha^{m+1} p_{m-2}^{(k-1)} \alpha^m + \sum_{n=2}^{m-1} p_{n-2}^{(k-1)} \alpha^n + \sum_{n=0}^{m-1} (a_n \alpha^n) b_{m-k}$$

$$= \sum_{n=2}^{m-1} \left( p_{n-2}^{(k-1)} \oplus p_{m-1}^{(k-1)} f'_n \oplus p_{m-2}^{(k-1)} f_n \oplus a_n b_{m-k} \right) \alpha^n +$$

$$\left( p_{m-1}^{(k-1)} f'_1 \oplus p_{m-2}^{(k-1)} f_1 \oplus a_1 b_{m-k} \right) \alpha +$$

$$\left( p_{m-1}^{(k-1)} f'_0 \oplus p_{m-2}^{(k-1)} f_0 \oplus a_0 b_{m-k} \right)$$

for $k = 2, 3, ..., m$ where $f'_n$ can be simplified to $f'_0=0$ and $f'_n f_{n-1}$, $m-1 \leq n \leq 1$, since $f_{m-1}=0$ for $3 \leq m \leq 34$ (recommended reference [3]).

Finally, comparing (2) with (8), we obtain $$p_0^{(k)} = p_{m-1}^{(k-1)} f'_0 \oplus p_{m-2}^{(k-1)} f_0 \oplus a_0 b_{m-k} \qquad (9)$$

$$p_1^{(k)} = p_{m-1}^{(k-1)} f'_1 \oplus p_{m-2}^{(k-1)} f_1 \oplus a_1 b_{m-k} \qquad (10)$$

and $$p_n^{(k)} = p_{n-2}^{(k-1)} \oplus p_{m-1}^{(k-1)} f'_n \oplus p_{m-2}^{(k-1)} f_n \oplus a_n b_{m-k} \quad 2 \leq n \leq m-1 \qquad (11)$$

Hereafter we will present a parallel-in, parallel-out, two-dimensional cellular-array power-sum circuit based on (1), and (9) to (11), for performing $AB^2+C$ computations.

Introduction to an Embodiment of the Invention:

A computation circuit is provided by the present invention for performing $AB^2$ computations in a finite field $GF(2^m)$ based on module polynomials f(x) and f(x) respectively represented by M-tuple vectors $(f_{m-1}, ..., f_{m-1}, ..., f_0)$ and $(f_{m-1}, ..., f_{m-1}, ..., f_0)$, where A and B respectively represented by m-tuple vectors $(a_{m-1}, a_{m-2}, ..., a_{m-1}, ..., a_1, a_0)$ and $(b_{m-1}, ..., b_{m-k}, ..., b_0)$ are arbitrary elements of $GF(2^m)$, the computation circuit is configured to comprise a group of cells (k, i) where k and i are positive integers ranging from 1 to m [m is identical to the superscripted $^m$ in the expression of $GF(2^m)$ and is an integer larger than 3], that is, k=1, 2, 3, ..., m and i=1, 2, 3, ..., m, the cell (k, i) providing, in response to $a_{m-i}$ (vector representing A), $b_{m-k}$ (vector representing B), $f_{m-i}$ (vector representing f(x)), and $f'_{m-i}$ (vector representing f(x)) applied thereto, and three operational signals OP1, OP2, and OP3 received thereat, a cell output signal $p_{m-i}^{(k)}$ which is equal to OP1 $\oplus$ (OP2*$f_{m-i}$) $\oplus$ (OP3*$f'_{m-i}$) $\oplus$ ($a_{m-i}$*$b_{m-k}$) where symbol $\oplus$ being an addition operation over the finite field GF(2), symbol * being a multiplication operation over said finite field GF(2), the OP1 received at each of a first type of the cells (k, i) where k ranges from 2 to m and i ranges from 1 to m-2, being the cell output signal $p_{m-i-2}^{(k-1)}$ provided by the cells (k-1, i+2), said OP1 received at the cell which is different from the first type of the cells is zero, the OP2 and the OP3 received at the cell (k, i) where k ranges from 2 to m and i ranges from 1 to m being respectively the cell output signals $p_{m-1}^{(k-1)}$ and $p_{m-2}^{(k-1)}$ provided respectively by the cells (k-1, 1) and (k-1, 2), and the OP2 and the OP3 received at said cell (k, i) where k=1 and i ranges from 1 to m are zero.

Each cell of the computation circuit may include an AND logic unit and an exclusive-OR logic unit, the AND logic unit receiving the $a_{m-i}$, the $b_{m-k}$, the $f_{m-i}$, the $f'_{m-i}$, the $p_{m-1}^{(k-1)}$, the $p_{m-2}^{(k-1)}$, and the $p_{m-i-2}^{(k-1)}$, and providing the exclusive-OR logic unit with the ($p_{m-1}^{(k-1)}$*$f_{m-i}$), the ($p_{m-2}^{(k-1)}$*$f_{m-i}$), and the ($a_{m-i}$*$b_{m-k}$), the exclusive-OR logic unit providing said cell output signal $p_{m-i}^{(k)}$ in response to the ($p_{m-1}^{(k-1)}$*$f_{m-i}$), the ($p_{m-2}^{(k-1)}$*$f_{m-i}$), the ($a_{m-i}$*$b_{m-k}$), and the $p_{m-i-2}^{(k-1)}$ provided by the AND logic unit.

The AND logic unit in each cell of the computation circuit may comprise a first AND gate receiving the $a_{m-i}$ and the $b_{m-k}$ to provide the ($a_{m-i}$*$b_{m-k}$), a second AND gate receiving the $p_{m-2}^{(k-1)}$ and $f_{m-i}$ to provide the ($p_{m-2}^{(k-1)}$*$f_{m-i}$), and a third AND gate receiving the $p_{m-1}^{(k-1)}$ and the $f'_{m-i}$ to provide the ($p_{m-1}^{(k-1)}$*$f_{m-i}$). The exclusive-OR logic unit in each cell of the computation circuit may comprise an exclusive-OR gate providing the cell output signal $p_{m-i}^{(k)}$ in response to the ($p_{m-1}^{(k-1)}$*$f_{m-i}$, the ($p_{m-2}^{(k-1)}$*$f_{m-i}$), the ($a_{m-i}$*$b_{m-k}$), and the $p_{m-i-2}^{(k-1)}$.

The exclusive-OR logic unit in each cell of the computation circuit may also be configured to comprise three exclusive-OR gates, the first providing a first exclusive-OR gate output signal in response to the ($p_{m-1}^{(k-1)}$ *$f_{m-i}$) and the ($p_{m-2}^{(k-1)}$*$f_{m-i}$); the second providing a second exclusive-OR gate output signal in response to the ($a_{m-i}$*$b_{m-k}$) and the $p_{m-i-2}^{(k-1)}$; and the third receiving the first exclusive-OR gate output signal and the second exclusive-OR gate output signal to provide the $p_{m-i}^{(k)}$.

Obviously the exclusive-OR logic unit in each cell of the computation circuit may also be configured to comprise three exclusive-OR gates, the first exclusive-OR gate providing a first exclusive-OR gate output signal in response to the ($p_{m-1}^{(k-1)}$*$f_{m-i}$) and the ($a_{m-i}$*$b_{m-k}$); the second exclusive-OR gate providing a second exclusive-OR gate output signal in response to the ($p_{m-2}^{(k-1)}$*$f_{m-i}$) and the $p_{m-i-2}^{(k-1)}$; and the third exclusive-OR gate receiving the first exclusive-OR gate output signal and the second exclusive-OR gate output signal to provide the $p_{m-i}^{(k)}$.

It can be realized the exclusive-OR logic unit in each cell of the computation circuit may also be configured to comprise three exclusive-OR gates, the first one providing a first exclusive-OR gate output signal in response to the ($p_{m-1}^{(k-1)}$*$f_{m-i}$) and the ($a_{m-i}$*$b_{m-k}$); the second one providing a second exclusive-OR gate output signal in response to the ($p_{m-1}^{(k-1)}$*$f_{m-i}$) and the $p_{m-i-2}^{(k-1)}$; and the third one receiving the first exclusive-OR gate output signal and the second exclusive-OR gate output signal to provide the $p_{m-i}^{(k)}$.

The computation circuit may also be used as a power-sum circuit to perform power-sum computations $AB^2+C$ in the finite field $GF(2^m)$ where C being an arbitrary element represented by a m-tuple vector $(c_{m-1}, ..., c_{m-i}, ..., c_0)$ over $GF(2^m)$, when the OP1 received at each of the cells (k, i) where k=m and i ranges from 1 to m is $c_{m-i}$.

It can be realized the power-sum circuit may be so configured that the $c_{m-i}$ received at each of the cells (m, i) where i ranges from 1 to m-2 is applied thereto through the exclusive-OR logic unit of the other cells, in order to have each of the cells (k, i) comprise the same circuits, and thereby a circuit structured as a cellular-array can be implemented. It must be pointed out that we may directly apply $c_{m-i}$ as the OP1 to be received at each of the cells (k, i) where k=m and i ranges from 1 to m. However, we may also apply $C_{m-i}$, through the exclusive-OR logic unit of some cells of the computation circuit, to cells (k, i) where k=m and i ranges from 1 to m as the OP1, without making any difference from that we directly apply $c_{m-i}$ as the OP1 to be received at each of these cells.

BRIEF DESCRIPTION OF THE TABLES

Table I shows Circuit comparisons between a conventional multiplier and the power-sum circuit provided by the present invention;

Table II shows the control word for programming the working field;

Table III shows Circuit comparisons between a conventional generalized multiplier and the generalized power-sum circuit provided by the present invention.

DETAILED DESCRIPTION OF THE PREFERRED EMBODIMENTS

The present invention may best be understood through the following description with reference to the accompanying drawings, in which:

A Cellular-Array Power-Sum Circuit

Figure 1A:
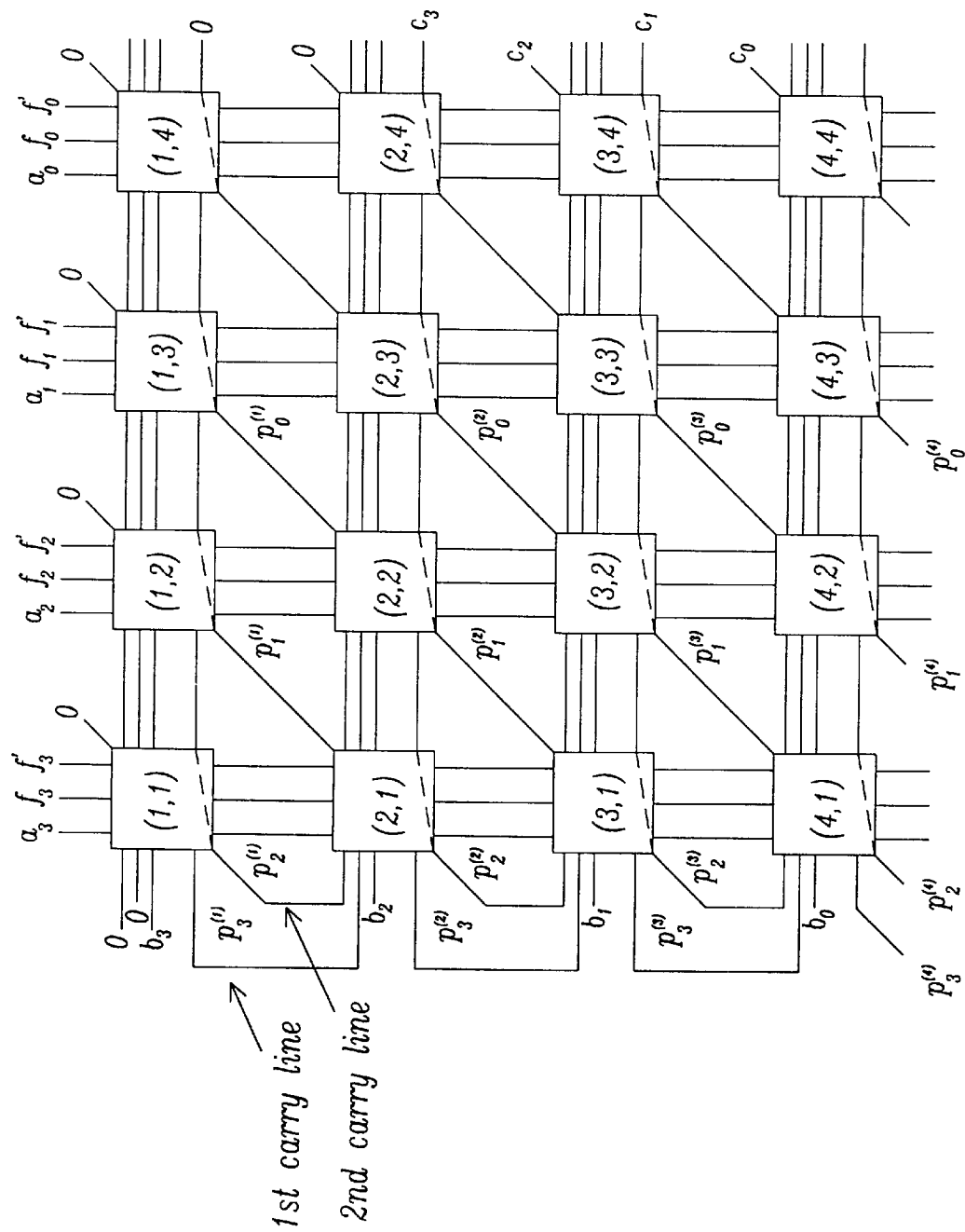
FIG. 1(a) shows the cell interconnection of an embodiment for a cellular-array power-sum circuit provided by the present invention for a finite field $GF(2^4)$.
Figure 1B:
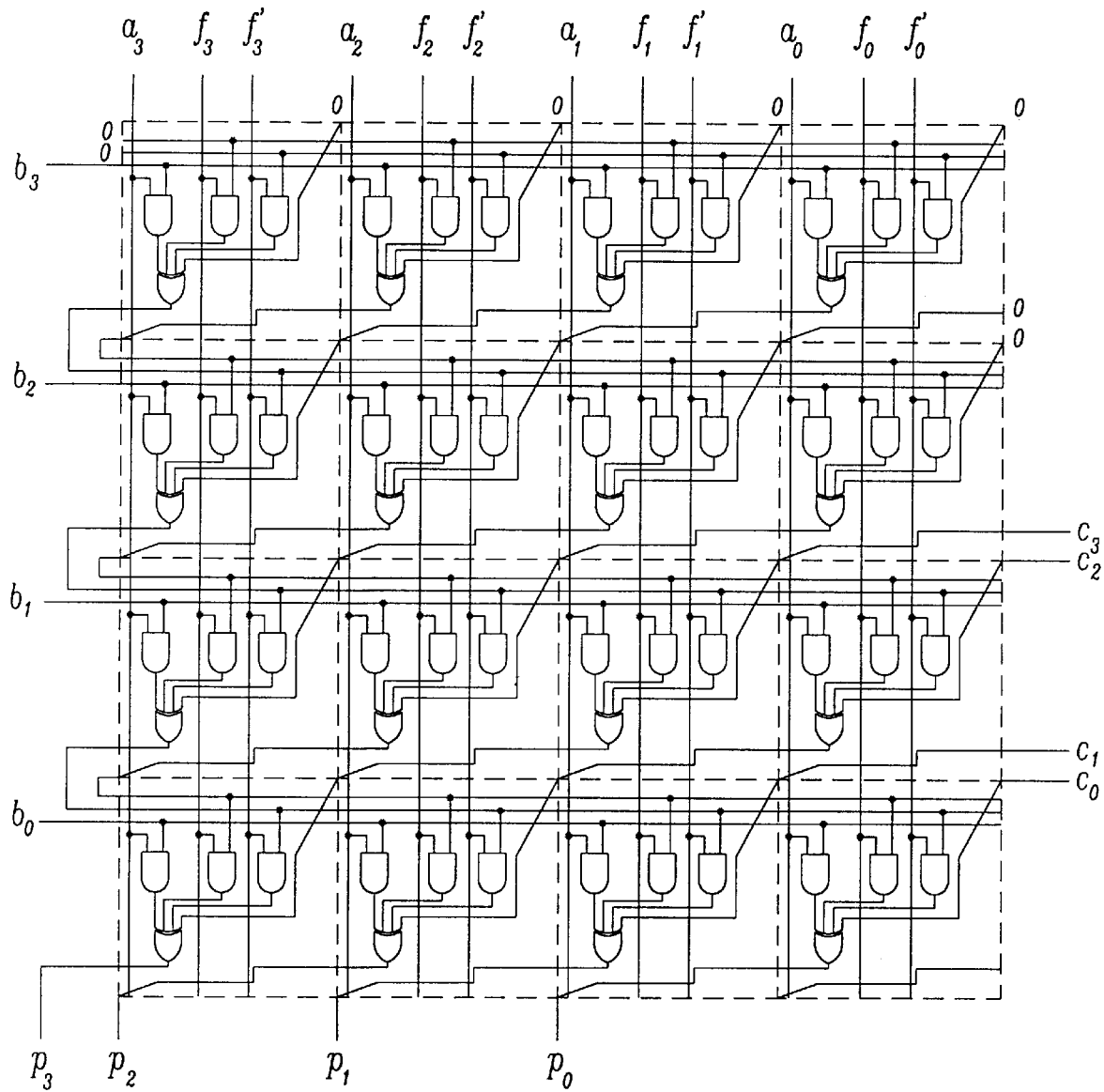
FIG. 1(b) shows the circuit diagram of an embodiment for a cellular-array power-sum circuit provided by the present invention for a finite field $GF(2^4)$.
Figure 2:
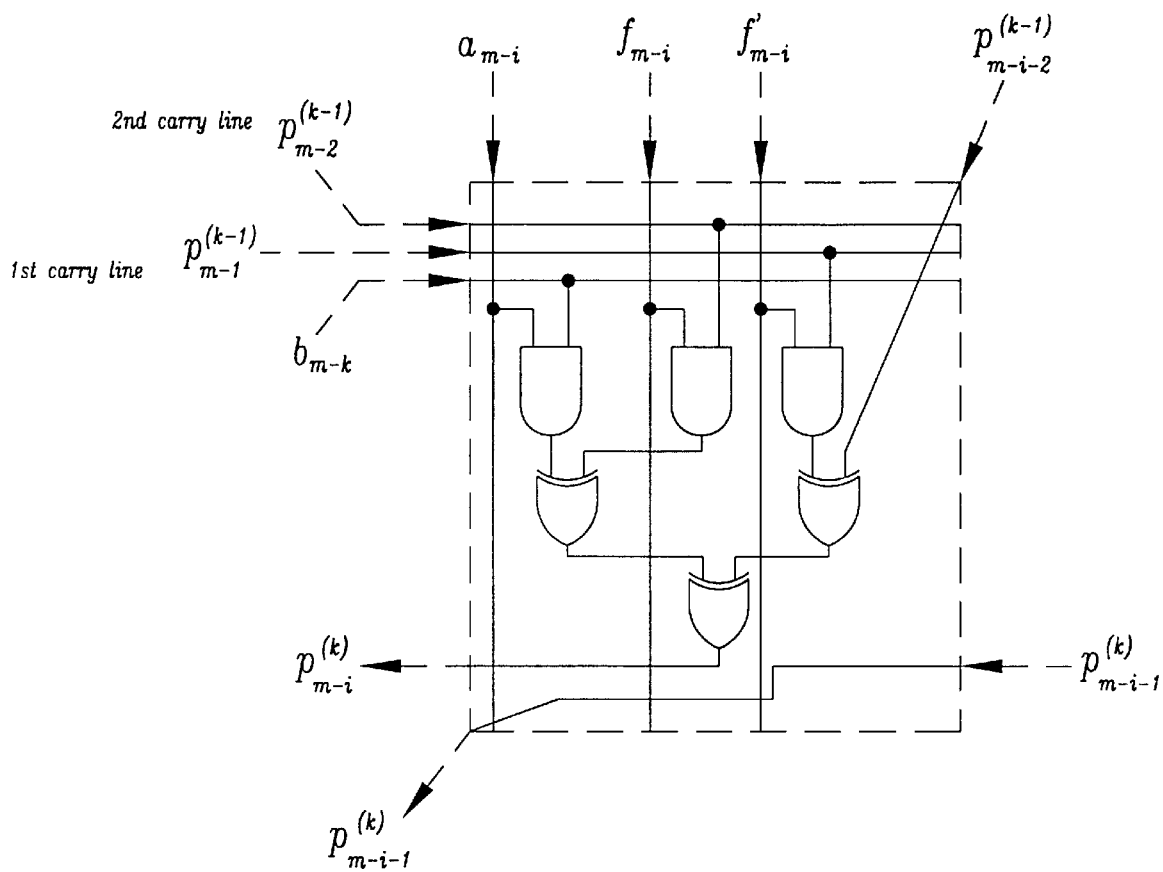
FIG. 2 shows the signal inputs/outputs and detailed circuit for a cell (k, i) of an embodied cellular-array power-sum circuit provided by the present invention for a finite field $GF(2^m)$.

FIG. 1(a) and 1(b) shows the power-sum circuit for $GF(2^4)$. It is clear from the figure that the architecture can be extended in an analogous way to any other finite field $GF(2^m)$. FIG. 1 also shows the input/output elements and the wire connections among the cells. A basic cell circuit based on (11) [(11) means Equation (11), hereafter (n) means Equation (n)] which is $p_n^{(k)}=p_{n-2}^{(k-1)} \oplus p_{m-1}^{(k-1)} f_n \oplus p_{m-2}^{(k-1)} f_n \oplus a_n b_{m-k}$ for $2 \leq n \leq m-1$, is shown in FIG. 2. The cell is made up of three 2-input AND gates and one 4-input XOR gate. Assume the cell shown in FIG. 2 to be located at the k-th row, i-th column of the power-sum circuit; $1 \leq k \leq m$; $1 \leq i \leq m$ (note that n=m-i and $0 \leq n \leq m-1$ in the embodiment); we shall hereafter refer to this cell as the (k, i) cell. In the (k, i) cell, the first AND gate is used to perform $a_{m-i} b_{m-k}$, the second AND gate is used to perform the $p_{m-2}^{(k-1)} f_{m-i}$ computation, and the third AND gate is used to perform the $p_{m-1}^{(k-1)} f'_{m-i}$ computation. If the cell is located in the first row, i.e. k=1, then the second and the third AND gates become redundant. If the cell is located in one of the other rows, then $p_{m-2}^{(k)}$ is obtained from the (k-1, 2) cell and $p_{m-1}^{(k-1)}$ is obtained from the (k-1, 1) cell. The 4-input XOR gate of the (k, i) cell is used to obtain the $p_{m-i}^{(k)}=p_{m-i-2}^{(k-1)} \oplus p_{m-1}^{(k-1)} f'_{m-i} \oplus p_{m-2}^{(k-1)} f_{m-i} \oplus a_{m-i} b_{m-k}$. In summary, a combination of the second and third AND gates and the 4-input XOR gate is used to perform the operation described in (11). Since the $P_{m-i}^{(k)}$ signal is obtained in the (k, i) cell while the $p_{m-i-2}^{(k-1)}$ signal comes from the (k-1, i+2) cell, a traverse line in the (k-1, i+1) cell is required to pass the signal $p_{m-i-2}^{(k-1)}$ from the (k-1, i+2) cell to the (k, i) cell.

When the cell is located in the right-most two columns (i.e., i=m-1 and i=m), the first term of (11), $p_{n-2}^{(k-1)}=p_{m-i-2}^{(k-1)}=p_{-1}^{(k-1)}$ for i=m-1 and $p_{n-2}^{(k-1)}=p_{m-i-2}^{(k-1)}=p_{-2}^{(k-1)}$ for i=m. Both of the values are zero since element C is absent. In such cases, (11) is reduced to (9) and (10). This means that zero signals must be fed to the inputs at the right side of the power-sum circuit, as shown in FIG. 1. Clearly, the circuit may easily be used to perform $AB^2+C$ operations by just feeding element C at the right- side input of the circuit, as shown by the illustrative circuit over $GF(2^4)$ in FIG. 1(b). On the other hand, when the cell is located in the first column, i=1 (i.e., the column located at the left-most side), the output signal of (k, 2) cell, $p_{m-i-1}^{(k)}$ will equal $p_{m-2}^{(k)}$, one of the input signals for the m cells in the (k+1)-th row. This implies that the traverse line within the (k, 1) cell must be connected to the first carry line at the left side of the power-sum circuit, as shown in FIG. 1(a). Similarly, in the first column of cells, the output signal of (k, 1) cell, $p_{m-i}^{(k)}$, must also be connected to the second carry line in the (k+1)-th row, because $p_{m-i}^{(k)}=p_{m-1}^{(k)}$ for i=1.

Table I shows some comparisons between the conventional multipliers presented by Laws and the new power-sum circuit. It can be seen that the power-sum circuit has the same computation time as the multipliers. Although two modulo polynomials F(x) and F'(x) are required in the power-sum circuit, the polynomial F'(x) can easily be obtained by shifting F(x) once to the higher order side.

Figure 3A:
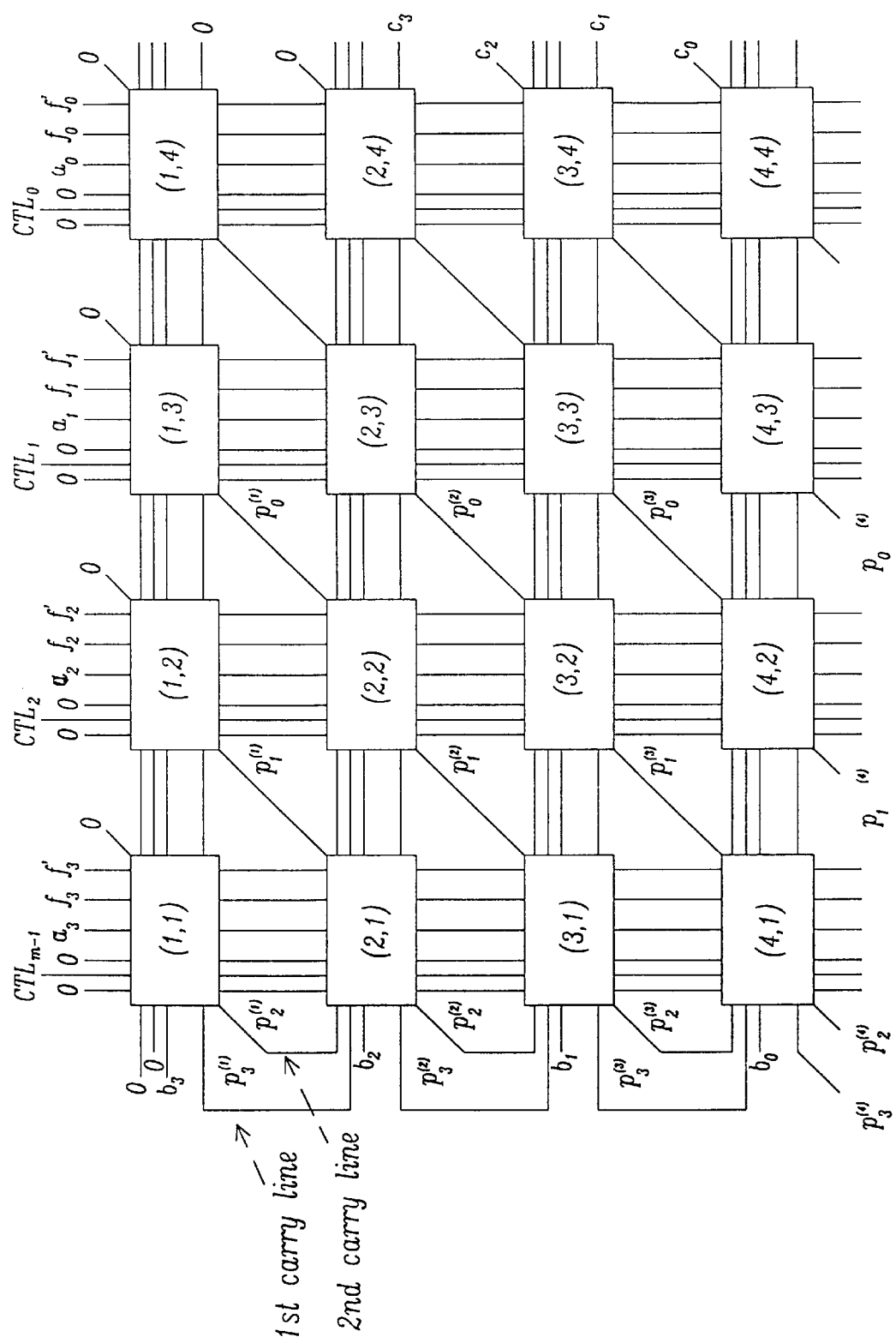
FIG. 3(a) shows the cell interconnection of an embodiment for a generalized cellular-array power-sum circuit provided by the present invention for a finite field $GF(2^4)$.
Figure 3B:
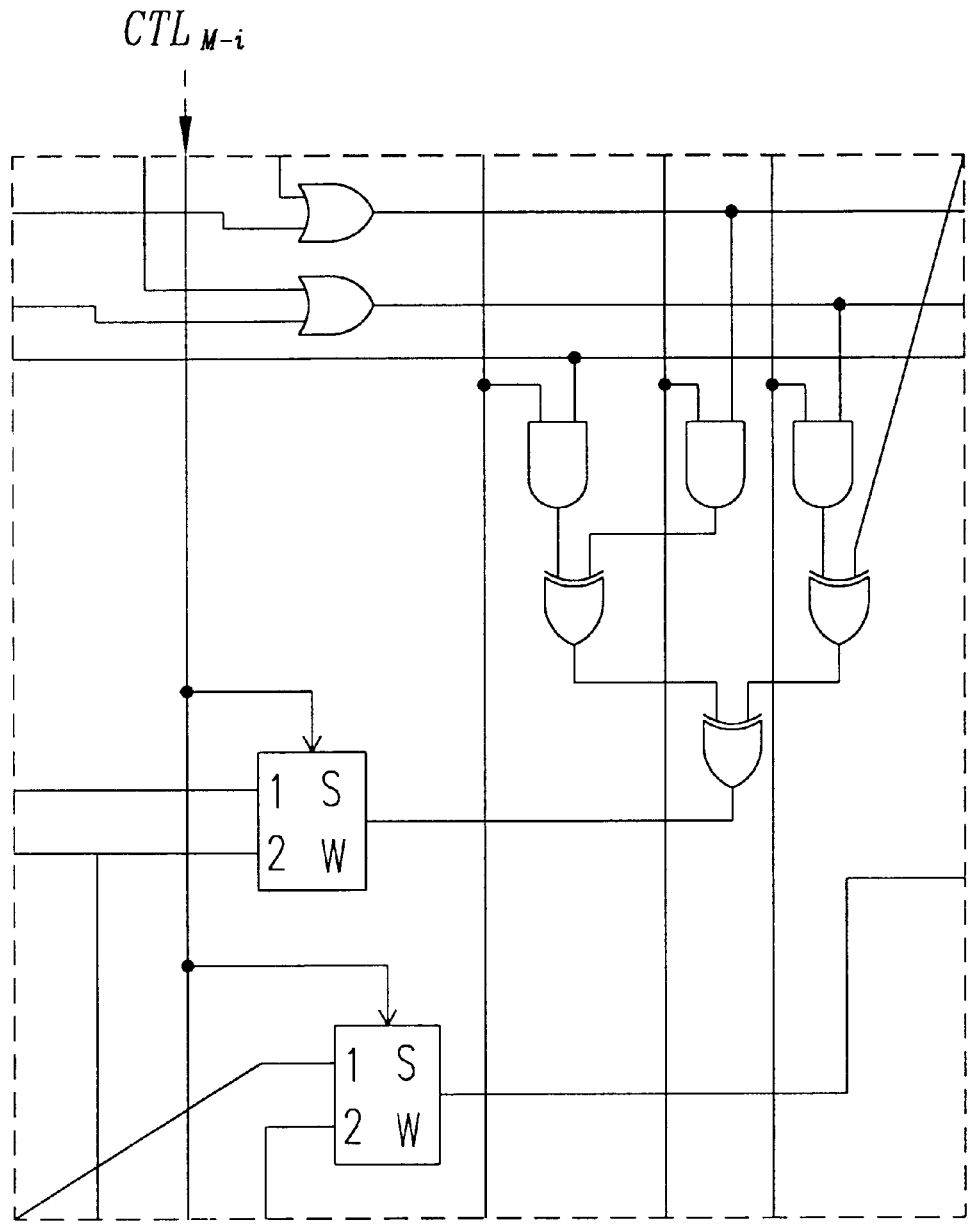
FIG. 3(b) shows the detailed circuit of an embodiment for a generalized cellular-array power-sum circuit provided by the present invention.
Figure 3B:
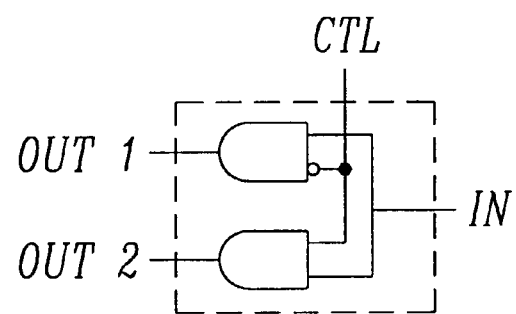

Generalized Power-Sum Circuit:

Presented below is a generalized power-sum circuit of type-I which is based on the power-sum circuit of fixed-field [used only for a specific $GF(2^m)$, such as that shown in FIG. 1(b) which is only for $GF(2^4)$]. Suppose the largest possible design field is $GF(2^M)$, then elements from $GF(2^M)$ may be represented as M-tuple vectors or polynomials of degree M-1. For example, suppose the operating field is $GF(2^{M-1})$, then an arbitrary element of $GF(2^{M-1})$, say A, may be represented as a polynomial of degree M-2, i.e., $A=a_{M-2}\alpha^{M-2}+a_{M-3}\alpha^{M-3}+ \ldots +a_1\alpha+a_0$. Mathematically, A may also be represented by a polynomial of degree M-1 but with a zero term of order $\alpha^{M-1}$, that is $A=0\alpha^{M-1}+a_{M-2}\alpha^{M-2}+a_{M-3}\alpha^{M-3}+ \ldots +a_1\alpha+a_0$. Furthermore, an arbitrary element from the operating field $GF(2^m)$, m<M, may be represented by a polynomial of degree M-1; that is, $A=0\alpha^{M-1}+ \ldots +0\alpha^{m-1}+a_{m-1}\alpha^{m-1}+a_{m-2}\alpha^{m-2}+ \ldots +a_1\alpha+a_0$. This implies that an m-tuple vector, representing an element in $GF(2^m)$, may be extended to an M-tuple vector by just filling "0" in at the higher order positions, such as (0, . . . , 0, $a_{m-1}$, $a_{m-2}$, . . . , $a_1$, $a_0$). The number of stuffed zeros is M−m. Similarly, the input elements, B and C, may also be extended to M-tuple vectors; that is, (0, . . . ,0, $b_{m-1}$, . . . , $b_0$) and (0, . . . ,0, $c_{m-1}$, . . . , $c_0$). According the same rule, the module polynomials $f(x)$ and $f'(x)$ may be represented as M-tuple vectors; that is, (0, . . . 0,$f_{m-1}$, . . . $f_0$) and (0, . . . 0, $f'_{m-1}$, . . . $f'_0$). Based on the above arrangement of these input elements and module polynomials, FIG. 3($a$) shows the I/O signals for a generalized power-sum circuit. Detailed circuit diagram of a cell from the generalized power-sum circuit is shown in FIG. 3($b$). Comparing FIG. 3($b$) with FIG. 2 (fixed-field power-sum circuit), we see that six extra logic gates are required in each cell of the generalized power-sum circuit. The circuit complexity of the generalized power-sum circuit is increased by a factor of two. A control word ($CTL_{m-1}$, $CTL_{m-2}$, . . . , $CTL_0$) is used to select the operating field. The mapping of the control word and the operating field are listed in Table II. The two switches of each cell that located in the i-th column are controlled by the control bit $CTL_{m-i}$. If $CTL_{m-i}=0$ then the switches are in the normal position (i.e., the 1st output port of each switch is connected to its input port). If $CTL_{m-i}=1$ then the 2nd output port of each switch is connected to its input port. In that case, the signal $P_{m-i}^{(k)}$ and $P_{m-i-1}^{(k)}$ of the (k, i)-cell will be connected respectively to the 1st and 2nd carry lines of the (k+1, i)-cell, for all k. This implies that the cells located in columns with order higher than $\alpha^{m-i}$ (i.e., to the left of the i-th column) become dummies. The control word may be set automatically by a circuit called bit-locator that was presented in [11] (recommended reference [11]). The bit-locator circuit may find the highest order bit of the primitive polynomial and thus determines the control word pattern (i.e., the field size). The circuit design of the bit-locator was described in detail in [11] (recommended reference [11]). A comparison between the generalized power-sum circuit and the generalized multiplier presented in [11] (recommended reference [11]) is summarized in Table III.

Field-Size-Controller (FSC):

The generalized power-sum circuit of type-I has a drawback that the computation speed of each cell is slower than that of the fixed-field power-sum circuit by a factor of two. The propagation delay of each cell of the generalized power-sum circuit is four gate delays (two AND gates, one 3-input XOR gate, and one OR gate) while the propagation delay of each cell of the fixed-field power-sum circuit is only two gate delays (one AND and one 3-input XOR). A circuit called field-size-controller (FSC) that improves the computation speed of the generalized power-sum circuit is presented below. Combining the FSC with previously presented fixed-field power-sum circuit (see FIG. 2), results in advance that may also be operated over different fields.

The proposed fixed-size power-sum circuit may be operated over a number of different fields by adding some peripheral circuits. For example, the power-sum circuit for GF($2^4$) shown in FIG. 1($b$) can be used to perform $AB^2+C$ operations over GF($2^3$) by just re-arranging elements A, B and C. While the rules for extending elements B and C to 4-tuple vectors are the same as those for Generalized Power-Sum Circuit, the rules for the element A and the module polynomials are not. They are in the following form: ($a_2$, $a_1$, $a_0$), ($f_2$, $f_1$, $f_0$, 0), and ($f'_2,f'_1,f'_0$, 0). With proper arrangements, the cells located in the 1st row and the fourth (right-most) column become dummies. Thus, a four-by-four cellular-array power-sum circuit may be functionally reduced to a three-by-three cellular-array power-sum circuit.

Described below is how to re-arrange element A and the module polynomials.

Figure 4:
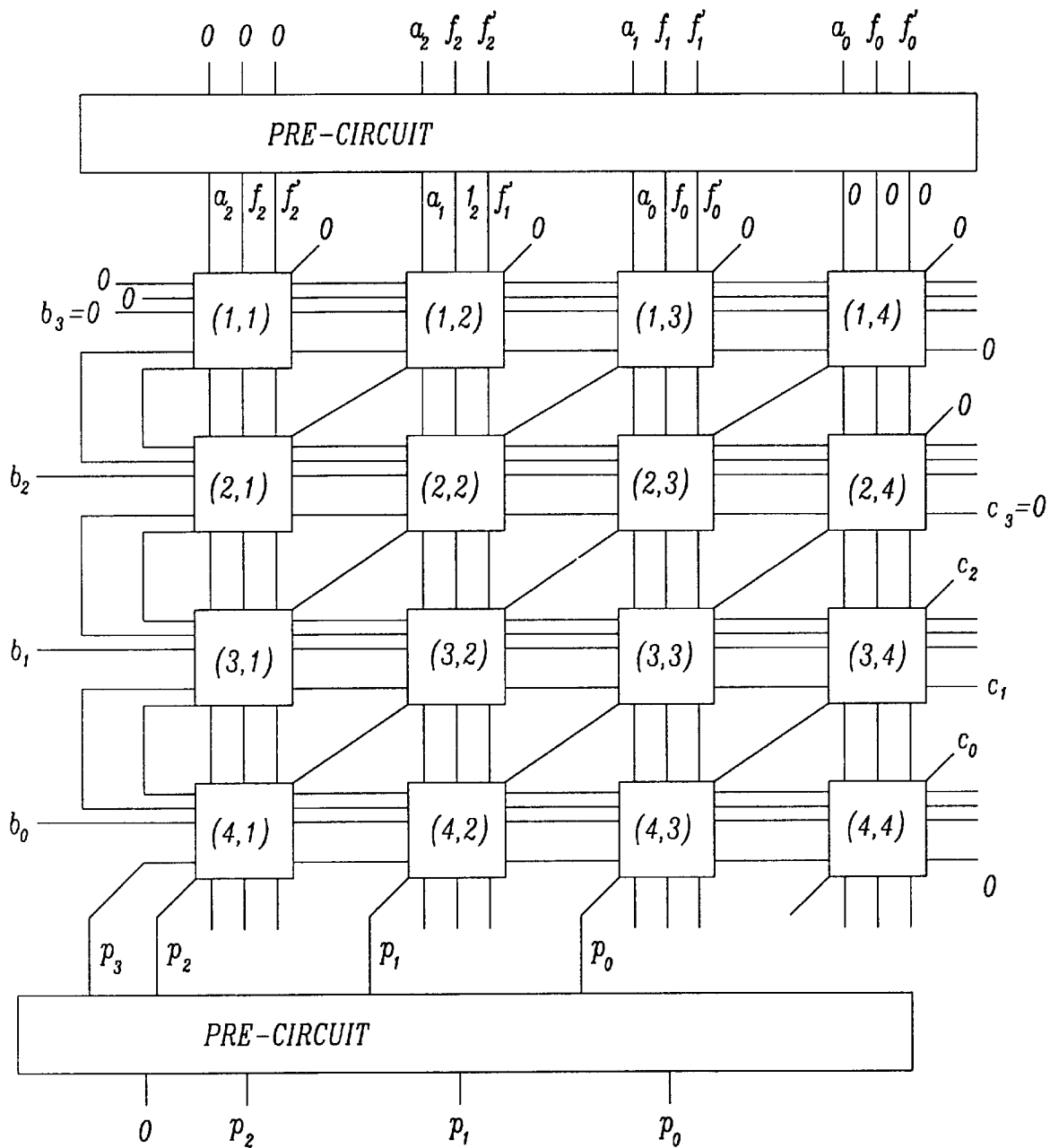
FIG. 4 shows a cellular-array power-sum circuit for a finite field $GF(2^4)$.
Figure 5:
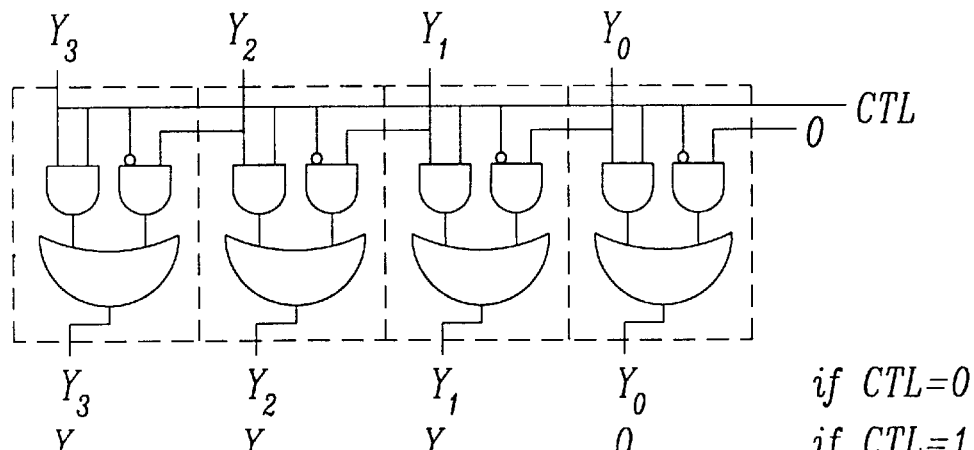
FIG. 5 shows a field-size-controller for programming a power-sum circuit.
Figure 5:
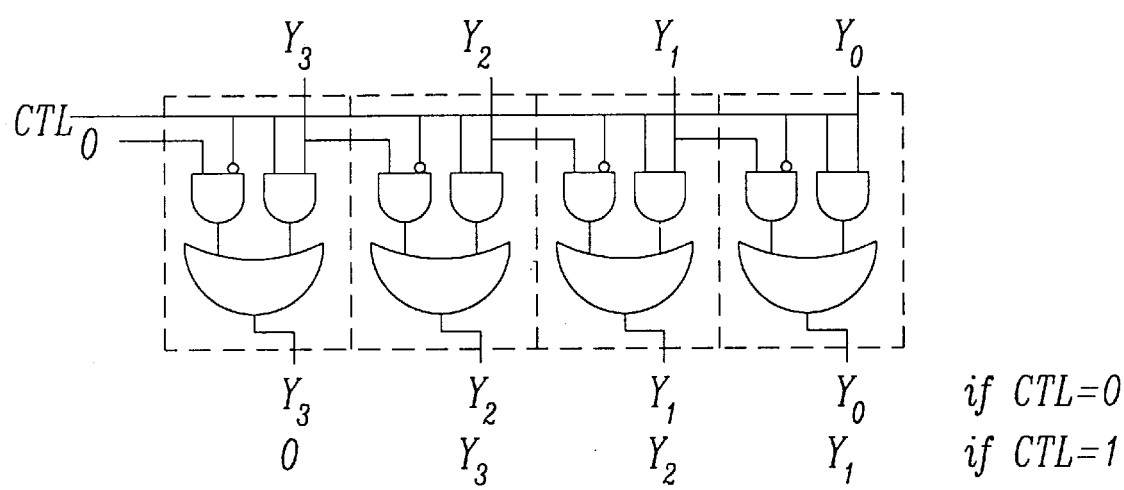
Figure 5:
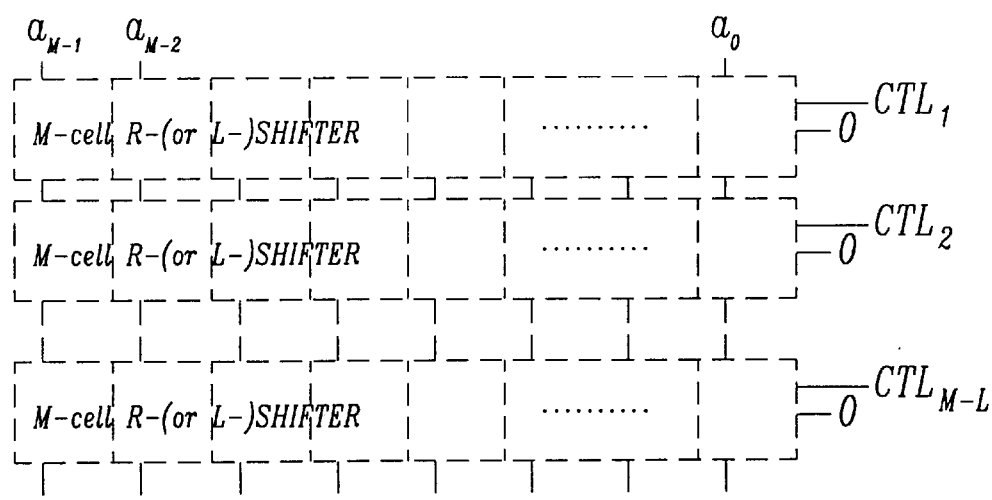
Figure 6:
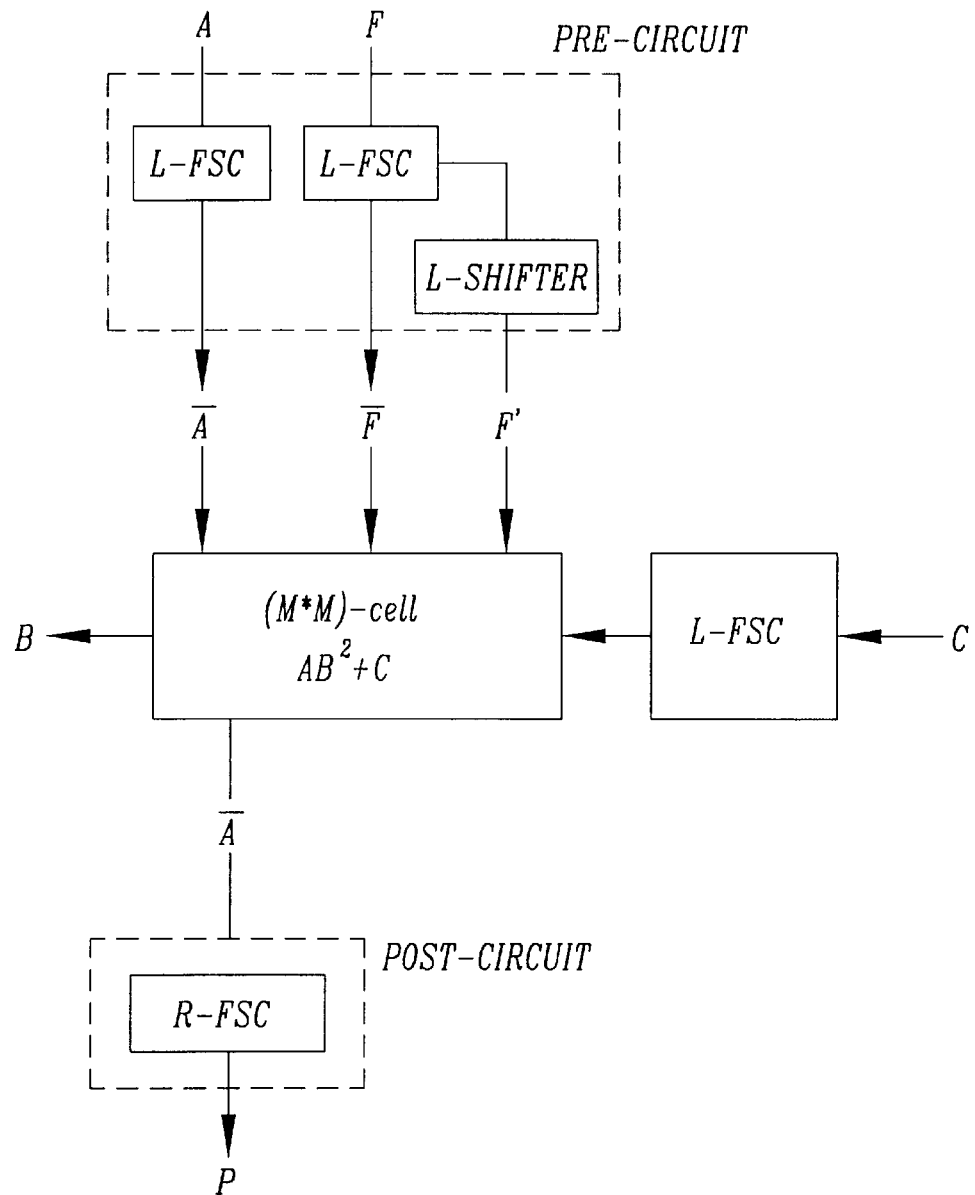
FIG. 6 shows a block diagram for a generalized power-sum circuit.
Figure 7:
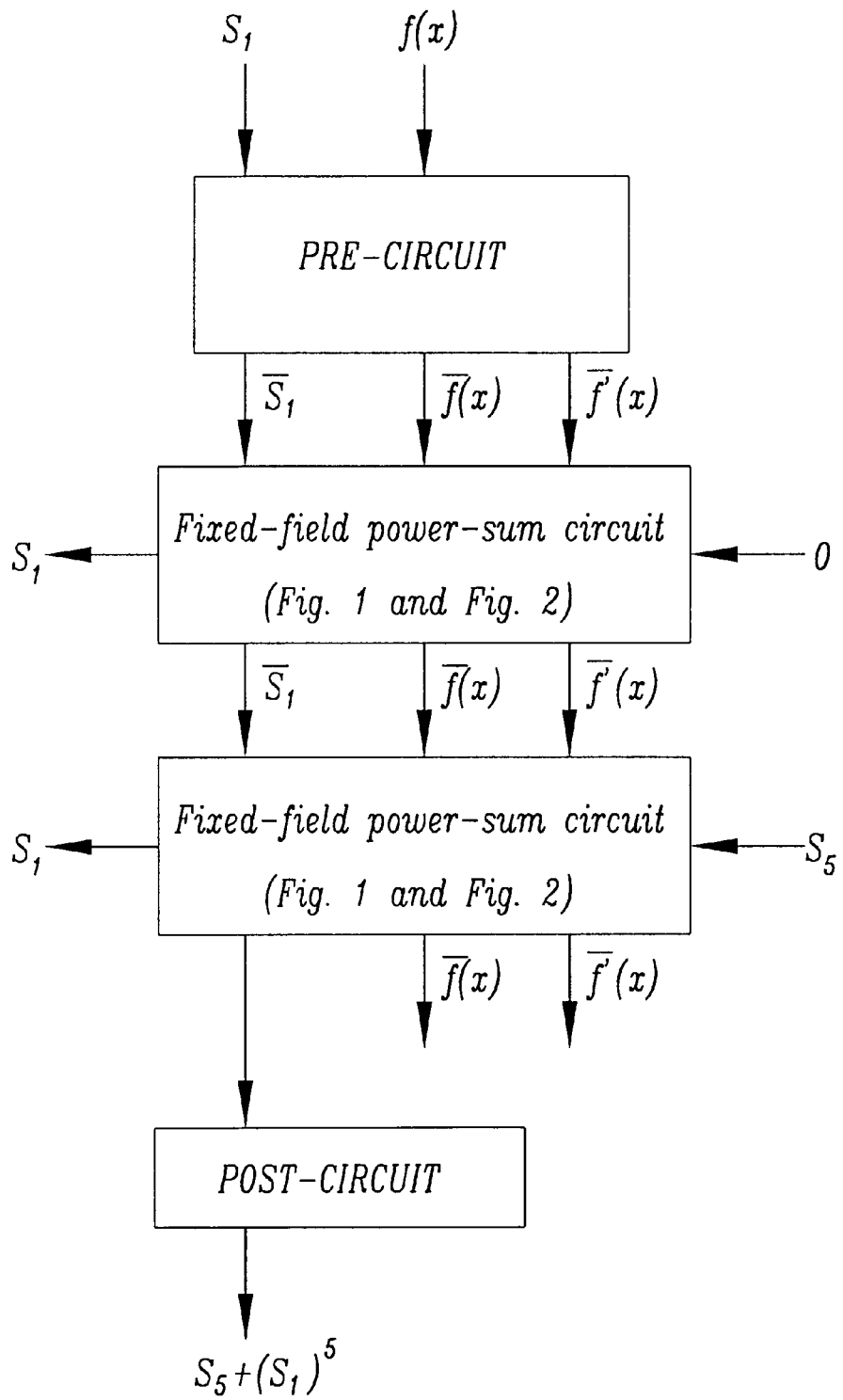
FIG. 7 shows a block diagram of an embodied circuit for calculating a specific application with a generalized power-sum circuit.

Suppose the designed field size of GF($2^m$) is $L \leq m \leq M$. The largest possible field is thus GF($2^M$), and elements from GF($2^M$) may be represented as M-tuple vectors. Therefore, the input elements, A, B, C, and module polynomials may be represented as M-tuple vectors; that is, (0, . . . ,0, $a_{m-1}$, . . . $a_0$) (0, . . . ,0, $b_{m-1}$, . . . , $b_0$), (0, . . . , 0, $c_{m-1}$, . . . , $c_0$), (0, . . . ,0, $f_{m-1}$, . . ., $f_0$), and (0, . . . , 0, $f'_{m-1}$, . . . , $f'_0$). However, the example illustrated in FIG. 4 shows, if the power-sum circuit designed in GF($2^4$) want to be operated over GF($2^3$), then the required vector patterns for A, $f(x)$, and $f'(x)$ must be ($a_2, a_1, a_0$, 0), ($f_2, f_1, f_0$, 0), and ($f'_2,f'_1,f'_0$, 0). Thus, the vectors of (0, $a_2$, $a_1$, $a_0$), (0,$f_2,f_1,f_0$), and (0,$f'_2,f'_1,f'_0$) need to be cyclic-shifting once to the left to make the highest order of zero be shifted to order $\alpha^0$. Extending this rule to the general case, if the power-sum circuit designed for GF($2^M$) want to operate over GF($2^m$), m<M, then element A and the module polynomials must be cyclic shifting M−m times to the left to become ($a_{m-1}$, . . . , $a_0$,0, . . . 0), ($f_{m-1}$, . . . $f_0$, 0, . . . 0), and ($f'_{m-1}$, . . . ,$f'_0$,0 . . . ,0). More explicitly, the M−m stuffed zeros must be moved into the right-most positions (order $\alpha^0$ to $\alpha^{M-m-1}$). With the cyclic shifting operation, the cells located in the upper M−m rows and the right-most M−m columns of the (M×M)-cell power-sum circuit become dummies. The (M×M)-cell power-sum circuit now may be functionally operated like an (m×m)-cell power-sum circuit over GF($2^m$). Below, a circuit, called a SHIFTER that performs the cyclic shifting of zeros is presented.

The design concept of the generalized power-sum circuit presented here is different from that for FIG. 3. The generalized cellular-array multipliers/power-sum-circuits based on FIG. 3 have the following advantages (i) the input elements, A, B, and C, are in the same vector form (that is, element A and the module polynomials need not be cyclic shifting) (ii) avoiding the need of extra peripheral circuits such as the FSCs. However, the cost is that the computation speed of each cell is slower than that of the fixed-field cellular-array-multiplier/power-sum-circuit by a factor of two. The type-I generalized power-sum circuit (based on FIG. 3) will be better than the type-II generalized power-sum circuit (fixed-field cellular-array-multiplier/power-sum-circuit) for single computations. However, for some particular computations, say $(S_1)^5+S_5$ for example, which is required for decoding a quat-error-correcting BCH code (see Section I), type-II generalized power-sum circuit will have better computation speed and circuit complexity performance. The hardware implementation of $(S_1)^5+S_5$ using type-II generalized power-sum circuits needs only one PRE-CIRCUIT and one POST-CIRCUIT. However, two type-I generalized power-sum circuits are required to implement the computation of $(S_1)^5+S_5$. In general, the more complex the computation, the bigger benefit in both computation speed and circuit complexity we may obtain from using the type-II generalized power-sum circuit.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computation circuit for performing $AB^2$ computations in a finite field GF($2^m$) based on module polynomials f(x) and f'(x) represented by m-tuple vectors ($f_{m-1}, f_{m-i}, \ldots, f_0$) and ($f'_{m-1}, \ldots, f'_{m-i}, \ldots, f'_0$), where m being a positive integer larger than 2, is the field size of said finite field GF($2^m$), A and B respectively represented by m-tuple vectors ($a_{m-1}, a_{m-2}, \ldots, a_{m-i}, \ldots, a_1, a_0$) and ($b_{m-1}, \ldots, b_{m-k}, \ldots b_0$) are arbitrary elements of GF($2^m$), said computation circuit comprising a group of cells (k, i) where k and i are positive integers ranging from 1 to m, that is, k=1, 2, 3, ..., m and i=1, 2, 3, ..., m, said cell (k, i) providing, in response to $a_{m-i}$, $b_{m-k}$, $f_{m-i}$, and $f'_{m-i}$ applied thereto, and three operational signals OP1, OP2, and OP3 received thereat, a cell output signal $p_{m-i}^{(k)}$ which is equal to OP1⊕(OP2*$f_{m-i}$)⊕(OP3* $f'_{m-i}$)⊕($a_{m-i}$* $b_{m-k}$) where symbol ⊕ is an addition operation over said finite field GF(2), symbol * is a multiplication operation over said finite field GF(2), said OP1 received at each of a first type of said cells (k, i) where k ranges from 2 to m and i ranges from 1 to m−2, being said cell output signal $p_{m-i-2}^{(k-1)}$ provided by said cells (k−1, i+2), said OP1 received at said cell which is different from said first type of said cells is zero, said OP2 and said OP3 received at said cell (k, i) where k ranges from 2 to m and i ranges from 1 to m being respectively said cell output signals $p_{m-1}^{(k-1)}$ and $p_{m-2}^{(k-1)}$ provided respectively by said cells (k−1, 1) and (k−1, 2), and said OP2 and said OP3 received at said cell (k, i) where k=1 and i ranges from 1 to m are zero.

2. The computation circuit according to claim 1 wherein said cell (k, i) includes an AND logic unit and an exclusive-OR logic unit, said AND logic unit receiving said $a_{m-i}$, said $b_{m-k}$, said $f_{m-i}$, said $f'_{m-i}$, said $p_{m-1}^{(k-1)}$, said $p_{m-2}^{(k-1)}$, and said $p_{m-i-2}^{(k-1)}$, and providing said exclusive-OR logic unit with said ($p_{m-1}^{(k-1)}*f_{m-i}$), said ($p_{m-2}^{(k-1)}*f'_{m-i}$), and said ($a_{m-i}*b_{m-k}$), said exclusive-OR logic unit providing said cell output signal $p_{m-i}^{(k)}$ in response to said ($p_{m-1}^{(k-1)}*f_{m-i}$), said ($p_{m-2}^{(k-1)}*f'_{m-i}$), said ($a_{m-i}*b_{m-k}$), and said $p_{m-i-2}^{(k-1)}$ provided by said AND logic unit.

3. The computation circuit according to claim 2 wherein said AND logic unit comprises a first AND gate receiving said $a_{m-i}$ and said $b_{m-k}$ to provide said ($a_{m-i}*b_{m-k}$), a second AND gate receiving said $p_{m-2}^{(k-1)}$ and $f'_{m-i}$ to provide said ($p_{m-2}^{(k-1)}*f'_{m-i}$), and a third AND gate receiving said $p_{m-1}^{(k-1)}$ and said $f_{m-i}$ to provide said ($p_{m-1}^{(k-1)}*f_{m-i}$).

4. The computation circuit according to claim 2 wherein said exclusive-OR logic unit comprises an exclusive-OR gate providing said cell output signal $p_{m-i}^{(k)}$ in response to said ($p_{m-1}^{(k-1)}*f_{m-i}$), said ($p_{m-2}^{(k-1)}*f'_{m-i}$), said ($a_{m-i}*b_{m-k}$), and said $p_{m-i-2}^{(k-1)}$.

5. The computation circuit according to claim 2 wherein said exclusive-OR logic unit comprises a first exclusive-OR gate providing a first exclusive-OR gate output signal in response to said ($p_{m-1}^{(k-1)}*f_{m-i}$) and said ($p_{m-2}^{(k-1)}*f'_{m-i}$); a second exclusive-OR gate providing a second exclusive-OR gate output signal in response to said ($a_{m-i}*b_{m-k}$) and said $p_{m-i-2}^{(k-1)}$; and a third exclusive-OR gate receiving said first exclusive-OR gate output signal and said second exclusive-OR gate output signal to provide said $p_{m-i}^{(k)}$.

6. The computation circuit according to claim 2 wherein said exclusive-OR logic unit comprises a first exclusive-OR gate providing a first exclusive-OR gate output signal in response to said ($p_{m-1}^{(k-1)}*f_{m-i}$) and said ($a_{m-i}*b_{m-k}$); a second exclusive-OR gate providing a second exclusive-OR gate output signal in response to said ($p_{m-2}^{(k-1)}*f'_{m-i}$) and said $p_{m-i-2}^{(k-1)}$; and a third exclusive-OR gate receiving said first exclusive-OR gate output signal and said second exclusive-OR gate output signal to provide said $p_{m-i}^{(k)}$.

7. The computation circuit according to claim 2 wherein said exclusive-OR logic unit comprises a first exclusive-OR gate providing a first exclusive-OR gate output signal in response to said ($p_{m-2}^{(k-1)}*f'_{m-i}$) and said ($a_{m-i}*b_{m-k}$); a second exclusive-OR gate providing a second exclusive-OR gate output signal in response to said ($p_{m-1}^{(k-1)}*f_{m-i}$) and said $p_{m-i-2}^{(k-1)}$; and a third exclusive-OR gate receiving said first exclusive-OR gate output signal and said second exclusive-OR gate output signal to provide said $p_{m-i}^{(k)}$.

8. The computation circuit according to claim 1 further performing power-sum computations $AB^2+C$ in said finite field GF($2^m$) where C being an arbitrary element represented by a m-tuple vector ($c_{m-1}, \ldots, c_{m-i}, \ldots, c_0$) over GF($2^m$), when said OP1 received at each of said cells (m, i) where i ranges from 1 to m is $c_{m-i}$.

9. The computation circuit according to claim 8 wherein said $c_{m-i}$ received at each of said cells (m, i) where i ranges from 1 to m−2 is applied thereto through said exclusive-OR logic unit of another said cells, thereby each of said cells (k, i) comprises the same circuits, whereby the computation circuit is in the form of a cellular-array.

10. The computation circuit according to claim 1 wherein each of said cells includes a first switch and a second switch, said first switch in said cell (k, i) where k ranges from 1 to k−1 and i ranges from 2 to m, receiving said cell output signal $p_{m-i}^{(k)}$ to provide, when a control word at a first status is applied thereto, said cell output signal $p_{m-i}^{(k)}$ to said second switch in said cell (k, i−1), and to provide, when said control word at a second status is applied thereto, said cell output signal $p_{m-i}^{(k)}$ to said cells (k+1, j) as said OP2, where i≦j≦m; said second switch in said cell (k, i) receiving said cell output signal $p_{m-i-1}^{(k)}$ provided by said first switch in said cell (k, i+1), to provide, when said control word at said first status is applied thereto, said cell output signal $p_{m-i-1}^{(k)}$ to cells (k+1, s) as said OP1, where s=i−1, and to provide, when said control word at said second status is applied thereto, said cell output signal $p_{m-i-1}^{(k)}$ to cells (k+1, w) as said OP3, where i≦w≦m; said first switch in said cell (k, 1), where k ranges from 1 to m−1, receiving said cell output signal $p_{m-i}^{(k)}$ where i=1, to provide, when said control word at said second status is applied thereto, said cell output signal $p_{m-i}^{(k)}$ to said cells (k+1, y) as said OP2, where i≦y≦m; said second switch in said cell (k, 1) receiving said cell output signal $p_{m-i-1}^{(k)}$ where i=1, provided by said first switch in said cell (k, 2), to provide, when said control word at said second status is applied thereto, said cell output signal $p_{m-i-1}^{(k)}$ to cells (k+1, u) as said OP3 where u ranges from 1 to m; said first switch in said cell (m, 1) receiving said cell output signal $p_{m-i}^{(k)}$ where k=m and i=1, to output, when a control word at said second status is applied thereto, said cell output signal $p_{m-i}^{(k)}$; said second switch in said cell (m, 1) receiving said cell output signal $p_{m-i-1}^{(k)}$ where k=m and i=1, provided by said first switch in said cell (m, 2), to output, when said control word at said second status is applied thereto, said cell output signal $p_{m-i-1}^{(k)}$; said first switch in said cell (m, h), where 1<h≦m−1, receiving said cell output signal $p_{m-i}^{(k)}$ where k=m and i=h, to provide, when said control word at said first status is applied thereto, said cell output signal $p_{m-i}^{(k)}$ where i=h, to said second switch in said cell (m, h−1), said second switch in said cell (m, h) where 1<h<m−1, receiving said cell output signal $p_{m-i}^{(k)}$ where k=m and i=h+1, provided by said first switch in said cell (m, h+1), to output, when said control word at said first status is applied thereto, said cell output signal $p_{m-i}^{(k)}$, whereby said computation circuit can perform $AB^2$ computations in every finite field GF($2^n$) where n is the field size of said finite field GF($2^n$) and 3≦n≦m.

11. The computation circuit according to claim 1 further comprising a pre-circuit and a post-circuit in order to perform $ab^2$ computations in every finite field $GF(2^n)$ based on module polynomials $F(x)$ and $F'(x)$ respectively represented by n-tuple vectors $(F_{n-1}, \ldots, F_{n-i}, \ldots, f_0)$ and $(F'_{n-1}, \ldots, F'_{n-i}, \ldots, F'_0)$, where said n is the field size of said finite field $GF(2^n)$, said a and b respectively represented by n-tuple vectors $(a'_{n-1}, a'_{n-2}, \ldots, a'_{n-i}, \ldots, a'_1, a'_0)$ and $(b'_{n-1}, \ldots, b'_{n-k}, \ldots b'_0)$ are arbitrary elements of said finite field $GF(2^n)$, and said i ranges from 1 to n, said pre-circuit receiving said vectors $(F_{n-1}, \ldots, F_{n-i}, \ldots, F_0)$, $(F'_{n-1}, \ldots, F'_{n-i}, \ldots, F'_0)$, and said element a to provide said $a'_{n-i}$, said $F'_{n-i}$, and said $F_{n-i}$ respectively as said $a_{m-i}$, said $f'_{m-i}$, and said $f_{m-i}$ to be applied to cell (k, i) for k ranging from 1 to said m and i ranging from 1 to n, and to provide zero as said $a_{m-i}$, said $f'_{m-i}$, and said $f_{m-i}$ to be applied to cell (k, i) for k ranging from 1 to said m and i ranging from n+1 to said m; said post-circuit receiving a said cell output signal $P_{m-i}^{(k)}$ from said cell (k, i) for k =m and i ranging from 1 to m, to provide $p_{n-i}$ which is equal to said cell output signal $p_{m-i}^{(k)}$ for k=m and i ranging from 1 to n, an element P represented by an n-tuple vector ($P_{n-i}$ for i ranging from 1 to n) is equal to said $ab^2$.

12. The computation circuit according to claim 11 wherein said pre-circuit comprises at least a shifter for shifting, in a first direction, parallel signals representing an m-tuple vector; and said post-circuit comprises at least a shifter for shifting, in a second direction, parallel signals representing an m-tuple vector.

* * * * *